(12) United States Patent
Hogan et al.

(10) Patent No.: US 7,921,024 B2
(45) Date of Patent: Apr. 5, 2011

(54) IT SERVICE MANAGEMENT TECHNOLOGY ENABLEMENT

(75) Inventors: John P. Hogan, Stone Ridge, NY (US); Courtney L. McCarthy, Atlanta, GA (US); Robert M. Mello, Jr., New York, NY (US); Louis C. Mosher, Syracuse, NY (US)

(73) Assignee: International Business Machines Corporation, Armonk, NY (US)

( * ) Notice: Subject to any disclaimer, the term of this patent is extended or adjusted under 35 U.S.C. 154(b) by 1160 days.

(21) Appl. No.: 11/564,355

(22) Filed: Nov. 29, 2006

(65) Prior Publication Data

US 2008/0126163 A1 May 29, 2008

(51) Int. Cl.
*G06Q 10/00* (2006.01)
(52) U.S. Cl. .............................................. 705/7; 705/8
(58) Field of Classification Search .................... None
See application file for complete search history.

(56) References Cited

U.S. PATENT DOCUMENTS

| | | | |
|---|---|---|---|
| 7,110,976 B2* | 9/2006 | Heimermann et al. | 705/37 |
| 2002/0035495 A1* | 3/2002 | Spira et al. | 705/7 |
| 2002/0059512 A1* | 5/2002 | Desjardins | 713/1 |
| 2003/0088456 A1* | 5/2003 | Ernest et al. | 705/10 |
| 2004/0044544 A1* | 3/2004 | Smith et al. | 705/1 |
| 2005/0044099 A1* | 2/2005 | Soares et al. | 707/102 |
| 2005/0071450 A1* | 3/2005 | Allen et al. | 709/223 |
| 2006/0112317 A1* | 5/2006 | Bartolini et al. | 714/47 |
| 2006/0247959 A1* | 11/2006 | Oden | 705/7 |

OTHER PUBLICATIONS

Ludwig, H., Hogan J. et al. "Catalog-based service request mangement" IBM system journal, vol. 46, No. 3, 2007.*
Crawford, C. H., Bate, G. P. et al., "Toward an on demand service-oriented architecutre," IBM system journal, vol. 44, No. 1, 2005.*
Cox D.E., and Kreger. H., "Management of service-oriented-architecture life cycle," IBM system journal, vol. 44, No. 4, 2005.*

* cited by examiner

*Primary Examiner* — Jonathan G. Sterrett
*Assistant Examiner* — Tzu-Hsiang (Sean) Lan
(74) *Attorney, Agent, or Firm* — Scully, Scott, Murphy & Presser, P.C.; William W. Schiesser

(57) ABSTRACT

Disclosed are a method and system for transforming organizations from a supply driven to service oriented, demand driven IT organization. The IT Service Management Technology Enablement Model provides a method for supply-oriented customers to move to an advanced, demand driven service utility. The method outlines the key technical enablers that need to be put in place to achieve specific milestones as they move from a supply driven to demand driven model. Key milestones include: aligning IT to the Business (communicate); productizing IT (Structure); IT as a Factory (Standardize); and IT as a Utility (Commoditize).

3 Claims, 2 Drawing Sheets

IT SERVICE MANAGEMENT TECHNOLOGY ENABLEMENT

BACKGROUND OF THE INVENTION

1. Field of the Invention

This invention generally relates to service management technology, and more specifically, the invention relates to transforming IT organizations from supply driven to service oriented, demand driven IT organizations.

2. Background Art

In today's highly competitive economic environment, IT executives are challenged to reduce costs and increase the quality, scope and volume of technical services required to meet their company's needs. This challenge has been manageable to date because of supply-side savings and because the service responsibilities have been spread between many independent groups. However, with the fluctuating demand for information and business critical technology solutions, the current path is not sustainable.

IT organizations strive to provide valuable services to the business that can increase profitability, improve competitive positioning and enhance ability to respond to market changes. In the past, the cost of these services did not need to be quantified because the relative benefits were perceived to be obvious. In an on demand world, IT services must grow or shrink quickly to meet the real-time needs and goals of the business.

Historically, IT organizations focused on supporting business growth, allowing independent groups to deploy heterogeneous technologies without centralized governance. These autonomous groups or silos often maintained different platforms, vendors and processes, which lead to over-provisioned and under-utilized computer resources. Additionally, the lack of a single method to provide feedback or communicate technology requirements has resulted in low customer satisfaction. The vast, complex infrastructure that plagues IT organizations today can often be attributed to rapid growth.

Today, IT organizations are expected to manage a more mature environment and not only be responsive to, but plan for the fluctuating demands of the business. This is not an easy task because IT organizations remain bloated from rapid growth and provide inefficient support services that have left business unit customers dismayed with the lack of value they are receiving for IT support expenditures. Business executives are also questioning the value received from ongoing IT investments, asking for greater IT financial visibility, and requiring more services and higher quality from IT.

CEOs are interested in improving financial performance and increasing shareholder value. Business executives will continue to rely on IT to deliver cost savings because IT spending accounts for nearly 50 percent of many companies' total capital expense. Research shows that for a firm that spends half its IT budget on infrastructure support, a 10 percent decrease in technology infrastructure costs can increase overall net income from 1-5 percent. With these statistics, it is not surprising that IT organizations are being asked to articulate the value of what they deliver to the business or face being outsourced.

CIOs face difficult challenges in an on demand world. They are expected to reduce infrastructure costs, enhance business capabilities, increase customer satisfaction and improve performance while spending less each year. For a number of years IT organizations have used supply-side techniques to reduce costs—including vendor contract negotiation, consolidation and standardization, strategic sourcing, and automation—but the rapid changes in the demand for IT services masks the impact of unit cost reductions achieved through supply-side efficiencies.

The demand change is driven by a number of factors including: existing service volume fluctuations, improved service level requirements with less downtime, and new service functionality needed by the business.

To reduce costs and increase value, IT organizations must shift focus from supply-side to demand-side efficiencies. IT organizations can control demand and shift a large portion of cost management responsibilities to the business by operating more like a competitive business and enabling users to make intelligent decisions about their service consumption and service level requirements IT executives now have the responsibility to ensure that the enterprise gets the most out of its IT investments—while maintaining a reputation for good customer service. They also need to be able to articulate the value the customer receives from those services, and to understand the underlying costs and triggers that drive those services and how to pull the right levers to make a service effective or render it out of existence. IT Executives must learn how to use financial transparency, volume consumption limits and pricing strategies to influence customer behavior. To meet these goals, most analysts are urging IT organizations to transform from supply driven to service-oriented demand driven delivery organizations.

Enabling a services-oriented demand driven model becomes a critical mechanism to take costs out of an organization without further reducing its capability to execute. Normal cost-cutting efforts continue to lack the singular focus, the breadth and depth of analysis required to address volume growth, service overbuying and the appropriate incorporation of new functionality. To accomplish this cost focused services alignment, a thorough analysis of the company's demand and growth levers and drivers is necessary to figure out exactly what drives consumption.

Ultimately, the ability to realize value—and the wisdom gained in the process—is a critical input to future strategies and decisions on portfolio targets and allocations. It is critical to the success of IT and the survival of the business to get the most out of its scarce resources while allowing IT to focus the business agenda and improve delivery.

Service delivery must now focus on influencing internal customer actions to better manage the technology demand they generate. The service oriented demand driven model provides a means for companies to change their behavior. Many of the excesses from recent years have led employees to believe that their individual purchases have minimal impact on the larger organization's spending. The service oriented demand driven framework challenges these excesses and other assumptions by 1) restructuring the way products and services are purchased and/or subscribed, and 2) making cost control every employee's responsibility, so that a culture of cost control becomes engrained within the organization. By educating the workforce and implementing the appropriate cost controls, demand for low value, high cost technology begins to vanish. The embedded user behavior modifications can help lead to improvements for communicating, reporting, and expense tracking and savings.

Aligning the organization and processes to a customer facing service orientation. Customers will have a self-service mechanism to request and subscribe services. Automated back end workflows are implemented to ensure service delivery efficiently and effectively manages the service requested by the consumer. The automated workflows are continually monitored and managed to ensure optimal service delivery and to measure the value of the service being delivered to customers.

Another key success to an effective service oriented demand driven model is to offer service alternatives. Decision-makers should be presented with a range of options, representing the many different approaches and levels of aggressiveness that can be used to remedy any situation. The solution of choice will depend on the underlying fact base of savings estimates, knowledge of potential areas where resistance may occur, and the estimated time it will take to implement the option. With sufficient analysis, all possibilities can be realistically assessed by considering their potential impact on the organization. Effective partnering allows an organization to integrate with diverse business units and help them meet their cost reduction objectives. To grease the wheels of demand management, the strategy-making process needs to result in a finite set of service alternatives based on prioritization against some type of strategic filter.

IT organizations need to offer tiered service levels for selected services, which allows customers to self-select the level of service they need from infrastructure. Tiers are then offered for the variable cost components of the service that are impacted by a change in customer choice. Organizations should then only tier the few services that constitute a significant portion of the infrastructure budget, instead of spending the resources to create tiers for all services. The job of IT is to ensure there is enough flexibility into their cost model to account for multiple levels of service. By offering business customers a choice of higher or lower service levels with corresponding increases or decreases in their cost, infrastructure empowers business customers to manage their IT costs.

By providing customers transparency into the cost of services and service-level options, they will make smart business decisions about the right level of service they need. Differing cost performance trade-offs then enables customers to reduce their IT bills by selecting lower service levels. Service level tiers can then contribute significantly to overall IT cost reduction efforts by allowing business units to choose service levels that match their budgets and needs. Excessive consumption of a service, such as e-mail storage or cellular phone charges, can be curbed by delivering individual consumption reports to the end users or their business managers. Where specific investments are not providing high benefit to the business, customers are able to reduce that investment level and reallocate funds to services that deliver a higher value to them. For many companies, this is the first time that services, quality and cost are gathered and analyzed holistically.

SUMMARY OF THE INVENTION

An object of this invention is to guide an IT organization on the path from moving from a supply driven to service oriented demand driven organization.

Another object of the invention is to identify key technical enablers that need to be put in place to achieve specific milestones as an IT organization moves from a supply driven to a demand driven model.

These and other objectives are attained with a method and system for transforming organizations from a supply driven to service oriented, demand driven IT organization. The IT Service Management Technology Enablement Model provides a method for supply-oriented customers to move to an advanced, demand driven service utility. The method outlines the key technical enablers that need to be put in place to achieve specific milestones as they move from a supply driven to demand driven model. Key milestones include: aligning IT to the Business (communicate); productizing IT (Structure); IT as a Factory (Standardize); and IT as a Utility (Commoditize).

A service oriented, demand driven approach brings the worlds of business and IT together to achieve business alignment, operational efficiency through automation, and IT financial administration. The rewards—both financially and organizationally—are earned through structural changes, increased communications to embed new behavior, performance tracking, and oversight to ensure that targets are being realized.

The service oriented, demand driven model establishes capabilities for measuring and tracking costs, delivering automated service workflows and associated tasks, and measuring quality of services provided. It manages the bottom line by understanding the underlying costs (Total Cost of Ownership) that are required to support individual customers bases (Customer View), individual products and services (Service/Product View) and individual business activities (Process View). Ultimately, the service oriented, demand driven model improves quality to a level that meets or exceeds customer expectations while minimizing service disruptions to the business by: reducing demand variability; reducing supply-demand misalignment; providing scalable communication mechanism; effectively articulating the infrastructure portfolio to align IT services with the current and future needs of the business and its customers; improving visibility of services costs, enabling customers to make informed consumption choices; aligning back end processes and workflows to front end services; understanding whether to move a particular service from a fixed to variable cost/pricing structure to further influence behavior, so now that customers can prevent service overbuying and have visibility into how consumption affects what they pay for the service; and creating a financial model in support of the services that are being delivered, this allows an organization to benchmark and to see where it can further improve unit costs.

Core to the model is the IT Service Management Conceptual Architecture, which outlines the key technical enablers required to fully transform a supply driven organization to a demand driven, service oriented organization. The conceptual architecture defines "what" technical enablers need to be put in place to support the demand driven, service oriented vision.

Further benefits and advantages of this invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
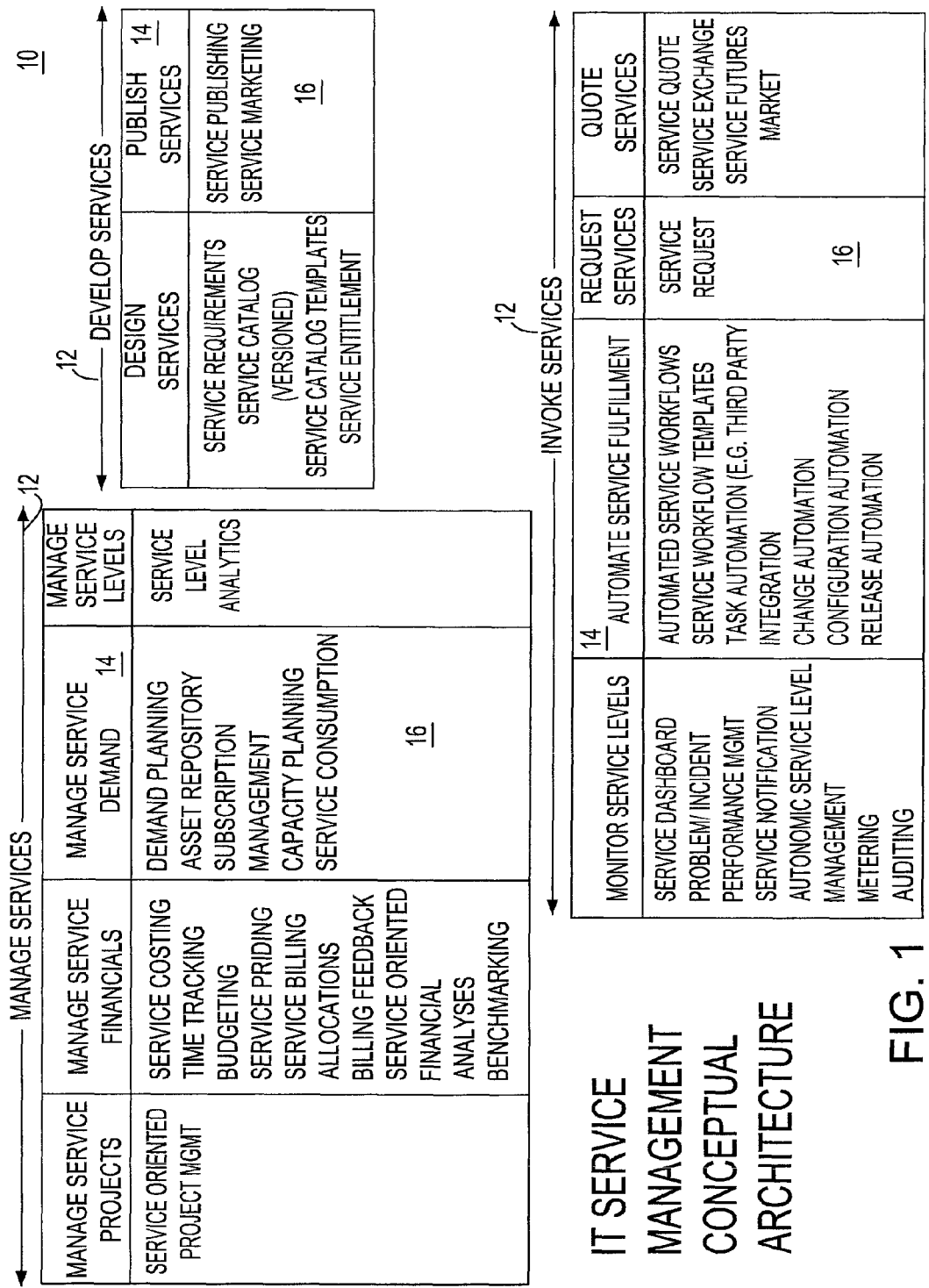
FIG. 1 shows an IT Service Management Conceptual Architecture Wheel.

As indicated above, core to the present invention is the IT Service Management Conceptual Architecture 10, shown in FIG. 1, which outlines the key technical enablers required to fully transform a supply driven organization to a demand drive, service oriented organization. The conceptual architecture defines "what" technical enablers need to be put in place to support the demand driven, served oriented vision.

IT Service Management Conceptual Architecture Wheel has three levels 12, 14 and 16, which each level inheriting the characteristics of its higher-level associations. The innermost level 12 within the architecture is the lifecycle phase definition. The middle layer 14 describes the required IT Service Management functions. And the outermost layer 16, the most critical, defines the key technical enablers required to deliver the capability of the associated function.

ITSM Lifecycle Phases

The IT Service Management Conceptual Architecture lifecycle phases, shown in level 12, are Develop Services, Invoke Services and Manage Services. The three phases are used to represent the end-to-end life of a service, from point of design and creation through its management and eventual decommission. The phases are used to categorize the functions and technologies required to support the end-to-end development and delivery of service.

ITSM Functions

The IT Service Management Conceptual Architecture high level functional requirements, shown in level 14, are used to depict a high level grouping of technical requirements, whose goal is to fulfill a certain capability needed within a service oriented organization. Each of these functions is aligned to one of the three-lifecycle phrases. The 10 high level functions include (definitions are included in the appendix): Design Services; Publish Services; Quote Services; Request Services; Automate Service Fulfillment; Monitor Service; Manage Service Levels; Manage Service Demand; Manage Service Financials; and Manage Service Projects.

ITSM Key Technical Enablers

The IT Service Management Conceptual Architecture key technical enablers, shown in level 16, are listed and defined in the appendix. The technical enablers are used to define key technologies, or service management applications, that need to be implemented to deliver the given function it is aligned.

The 39 key technical enablers structure the conceptual technical vision which an IT organization can benchmark itself, to understand if its current and planned technical architecture will meet the requirements of a service oriented, demand driven architecture. IT organizations can create a gap analysis, and a plan of attack on which technical enablers need to be modified or added to satisfy the service oriented, demand driven requirements.

To create this plan of attack, IT organization's need a set of directions to guide them to which technical enablers should be tackled in order of priority.

Armed with the knowledge that IT organizations must be able to respond quickly to an always-changing marketplace, CIOs are embracing the concept of managing their organizations as if they were wholly owned external businesses. The concept is quite straightforward. However, the challenge lies in the roadmap of how to make the transition.

Figure 2:
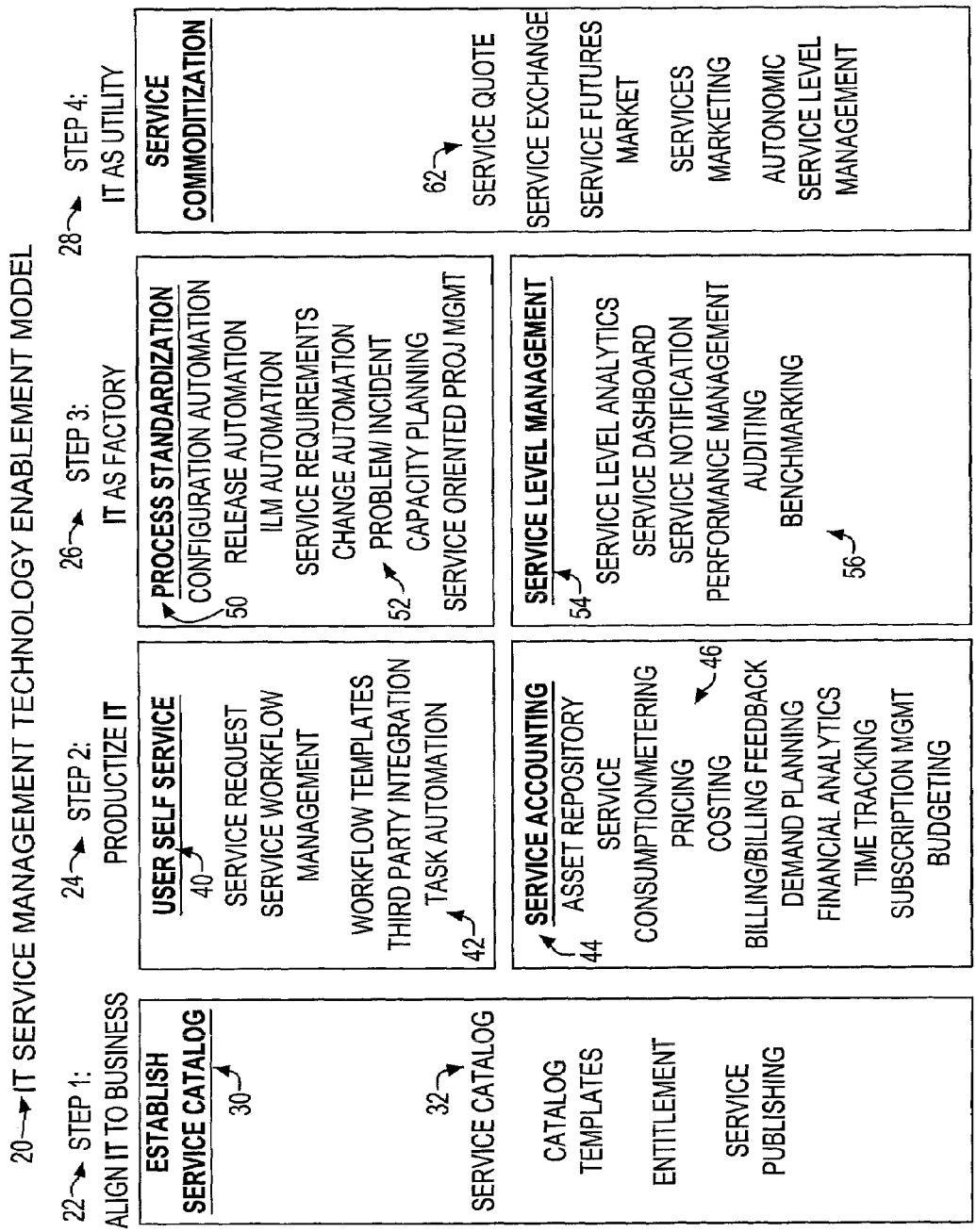
FIG. 2 identifies four key milestones of the IT Service Management Technology Enablement Model of the present invention.

A very limited few IT organizations have begun to structure themselves in a true service oriented, demand driven format. The IT Service Management Technology Enablement Model provides a roadmap to help more organizations pursue the transformation from a supply driven to service oriented, demand driven IT organization. With reference to FIG. 2, the ITSM Enablement model 20 orients itself around four key milestones. The first milestone 22 is to align IT to the business with a goal of forming a cohesive communication framework with customers. The second milestone 24 is to productize IT, structuring IT (organization. technology, process, financials) around the services and products it communicates and delivers to customers. The third milestone 26 is to transform IT into a factory, by consolidating and standardizing key processes while putting in service oriented measurement and feedback mechanisms. The final milestone 28 is to run IT as a utility, effectively transforming targeted services and their underlying infrastructure into a commodity.

Each milestone is described in more detail, and the associated technical enablers required to achieve the milestone are defined:

IT Service Management Technology Enablement Model Overview 1) Align IT to the Business The first step 22 to becoming a service oriented, demand driven organization is to treat end-users (the business) like they are customers—understand their needs and requirements and align that back to IT's strategy and vision. This is done by developing a service catalog to define and communicate the quality products and services the "IT business" offers to their customers. This is a key step because it establishes a common communication mechanism between the IT organization and the business units.

a) Establish Service Catalog

When articulating its services, IT must make them meaningful to the customer as the business is demanding an IT service they can understand and thus, are willing to pay for. Put simply, the IT organization needs to work with the lines of business to establish an IT service catalog 30, articulating what the business will get out of IT in business terms through the form of services. The service catalog needs to be at a manageable level, to avoid too much administration. Using templates provided by consulting groups, software vendors or best practice repositories helps an IT organization to quickly build its service catalog at a manageable level. The catalog must be easily accessible to the users, and each user should only be entitled to see the services they have permission to subscribe/request.

Thus, as shown in FIG. 2, the key technical components 22 of the Establish Service Catalog milestone are: service catalog, catalog templates, entitlement, and service publishing.

2) Productize IT

The IT organization must structure itself and communicate through the services/products it delivers. Only after the IT organization fully aligns to the customer driven service oriented, demand model—through process, organization structure, technology and financials—will efficiencies be maximized. Key technologies must be put in place to support the processes to productize IT while maintaining effective customer service and overall decision-making.

a) User Self Service

First, a front-end portal for the service catalog is established. From here all services can be requested or subscribed to on an "as needed" basis. End users will have, as represented at 40, a real time self-service mechanism to request or subscribe to any of the services they are permitted to access. Once requested, the status of the order can be tracked by the requestor through the portal in real time.

The subsequent steps include designing and automating the back end workflows of each service. Not only does the IT organization want to effectively communicate what IT does for the business, the IT organization also needs to effectively deliver valuable services. By automating the service fulfillment and associated approvals within a service workflow, service quality increases as execution time decreases, leading to an increased probability of service level attainment and overall value to the consumer.

Lastly, repetitive tasks within a workflow are automated and/or integrated to a 3rd party automation system. Examples of automated tasks include imaging AIX on a server or distributing a specific piece of software such as Visio to a workstation.

Thus, as shown in FIG. 2, the key technical components 42 of the User Self Service milestone are: service request, service workflow management, workflow templates, third party integration and task automation.

b) Service Accounting

For an IT organization to be fully productized, it must understand how IT costs relate to ongoing services, and how to appropriately allocate those costs to the consumers who receive value from these services. In other words, like any successful business, it is important to charge appropriately for the services provided.

The service accounting 44 is the key to providing financial transparency and enabling customers to make informed decisions about service consumption. For a service oriented financial system to be implemented successfully, asset repositories (consolidated), metering technologies, and financial cost pools must have a service orientation. Every IT cost, including all labor and assets (logical (e.g., metering—MIPS) and physical), must appropriately map to a service. Labor hour cost mapping requires actual labor hours to be tracked by service through a labor tracking system.

Service consumption and service subscription repositories must be put in place to support the billing and demand planning processes. Billing occurs within standard time periods, and bills are presented based on the services a business unit consumes/subscribes to within the period. The business unit will use a financial analytics engine to evaluate the underlying inventory detail under a bill, and using a billing feedback workflow module, will dispute incorrect inventories and associated charges.

Budgeting and pricing takes place on a cyclical basis (often yearly The business units will use demand planning technology to articulate the upcoming demand for existing services. The IT organization will use this demand and associate it to current service oriented cost data to draft a first estimated price for the service. Based on the estimated pricing, the business unit will provide new input into projected demand—leading to revised pricing for changing projected demand. The IT organization will aggregate all demand and update its upcoming service oriented budget to support the demand projections.

As shown in FIG. 2, the key technical components 46 of the Service Accounting milestone are: asset repository, metering, service consumption, pricing, costing, billing/billing feedback, demand planning, financial analytics, time tracking, subscription management, and budgeting.

3) IT as a Factory

After the IT organization has been productized, the focus can evolve to driving efficiencies through standard processes and measurements. Efficiencies are established through standard processes, driven through automation, and service driven measurements that lead to fact based decision-making.

a) Process Standardization

After service workflows have been automated, key processes must be documented, formalized and standardized across the IT organization, as represented at 50. Depending upon the services that are designed and implemented, key service delivery processes will need to be assessed and potentially refined. Key Process Indicators (KPIs) are defined to reflect the underlying process and measure performance. The primary processes to automate include configuration, change, release, problem/incident, capacity and service oriented project management.

The key technical components 52 of Process Standardization are: configuration process automation, release process automation, information lifecycle management automation, change automation, problem/incident automation, service requirements automation, capacity planning automation, and service oriented project management.

b) Service Level Management

The service catalog is supported by Service Level Agreements (SLAs). It is critical to customer satisfaction that the service delivery organization meets the established SLAs. Both real time and ad hoc service level reporting is established to ensure measurements of KPIs are available to support fact based decision-making. Ad hoc service level analytics will allow the IT organization and the consumer of service to understand where services historically have/have not met their service level objectives (to be used in a multitude of ways). A real time service dashboard will be established to allow the IT organization and the consumer of service to understand the current consumption of service and service level attainment at any given period of time.

Performance monitors are established to measure compliance with current service oriented service level objectives. If service levels are meeting or exceeding a particular threshold, notifications will be sent in real time to key affected parties.

Historical records are continually audited to ensure service compliance with industry and organizational regulations and policies. Service costs and service level attainment are benchmarked against best practices and third party external service providers to understand the service competitiveness of the IT organization.

Key technical components 56 of the Service Level Management milestone are: service level analytics, service dashboard, service notification, performance management, auditing and benchmarking.

4) IT as a Utility

A productized, standardized IT organization can structure itself to make real time, dynamic decisions. Services that align themselves to variable cost structures and architectures can be configured to allow for market pricing and competitive bidding. The flexible IT architecture can facilitate multiple suppliers bidding for service contracts, in real time, driving efficiencies while meeting variable demands.

a) Service Commoditization

Once a service has been standardized and structured into a variable cost structure it has the capability to employ real time market forces to its pricing and execution. The first step towards delivering these service oriented market forces, is to provide real time quotes for service requests based on just in time cost parameters (single deliverer of service).

More advanced services allow for competitive bidding based on two or more potential service providers. These multiple providers can market their service capabilities through search engines, banner ads or other traditional advertising techniques. The IT organization can employ multiple types of auctions, such as standard highest bid auctions, reverse auctions or Dutch auctions, which allow service providers to bid on new service contracts. As certain services become increasingly commoditized, a services futures market can be established to create contracts for service delivery in upcoming weeks/months/years, granting the IT organization hedging capabilities, and avoiding potential spikes/valleys in overall future service pricing.

As services are standardized, they will also have the opportunity to be managed in a more advanced form. Autonomic service level management technologies will be used to proactively detect upcoming service level threshold breaches by calculating task completion and then comparing that to task time remaining and resource availability. Automated responses can then be programmed to detect and correct the root cause problem prior to a disruption.

Key technical components 62 of the Service Utility milestone are: service quote, service exchange, service futures market, services marketing and autonomic service level management.

As will be readily apparent to those skilled in the art, aspects of the present invention may be realized in hardware, software, or a combination of hardware and software. Any kind of computer/server system(s)—or other apparatus adapted for carrying out various methods or features described herein—is suited. A typical combination of hardware and software could be a general-purpose computer system with a computer program that, when loaded and executed, carries out features described herein. Alternatively, a specific use computer, containing specialized hardware for carrying out one or more of the functional tasks, could be utilized.

In addition, features disclosed herein may also be embodied in a computer program product, which when loaded in a computer system is able to carry out these features. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

Appendix

The IT Service Management Conceptual Architecture lifecycle phases are defined as:

Develop Services—Includes the functions and enablers required to define, design, publish and market services.

Invoke Services—Includes the functions and enablers required to quote, order, fulfill, monitor, meter and remediate the on-going health of services.

Manage Services—Includes the functions and enablers required to 1)measure and benchmark performance as it relates to the quality of service delivery and 2)influence consumer behavior, through financial means, towards consumption of services.

The IT Service Management Conceptual Architecture high level functions are defined as:

Design Services—The capability required to define and structure services according to predefined taxonomy, based on consumer requirements, through a service catalog.

Publish Services—The capability required to publish and market/advertise services to consumers.

Quote Services—The capability required to allow 1)a consumer to request a quote for a service and 2)a provider to research and present the range of available prices of available service choices.

Request Services—The capability required to allow a consumer to request and/or subscribe an existing service from a provider.

Automate Service Fulfillment—The capability required to automate the execution of a service request. This includes automated coordination of the workflows and associated processes/activities required to fulfill the service, including approvals.

Monitor Service Levels—The capability required to provide real time monitoring and measurement of the on-going health available services. Includes the capability to reactively or proactively respond to deterioration of service quality.

Manage Service Levels—The capability required to report on the quality of service level attainment for each of the available services.

Manage Service Demand—The capability required to allow 1)the provider to measure ongoing consumption of services, 2)the consumer to project their upcoming service demand, and for 3) the provider to aggregate demand and plan for its future to capacity requirements.

Manage Service Financial—The capability required to allow a provider to measure costs as they relate to service delivery and investment and allocate those costs, through appropriate pricing techniques, to consumers. These capabilities promote the influencing of consumer consumption behavior and fact based investment/divestiture service oriented decision-making.

Manage Service Projects—The capability required to manage projects as they relate to investment in existing or new services.

The IT Service Management Conceptual Architecture key technical enablers require to support the transformation to a service oriented, demand driven model are defined as:

Service Requirements—The technical module require to allow a consumer to document needs for a potential new service, and for the service developer to translate those needs into prioritized service characteristics.

Service Catalog (Versioned)—The technical module required to design and structure a flexible service catalog according to a predefined taxonomy, with versioning capabilities.

Service Catalog Templates—Pre-defined service catalogs artifacts, which can be populated into an existing service catalog structure.

Service Entitlement—The technical module required to declare and enforce which consumers and providers can have access to specific services and associated service details.

Service Publishing—The technical module require to communicate the front end of the service catalog to consumers and providers.

Service Marketing—The technical module required to promote and advertise services to potential consumers (e.g., banner adds, search advertising).

Service Quote—The technical module required to allow 1) a consumer to requires a quote for service and 2) provider to present specific pricing based on point in time cost parameters and service level requirements.

Service Exchange—The technical module required to allow 1) a consumer to requires multiple bids for service and, 2) multiple providers to bid to win the service, 3) consumer to select a service provider based on best combination price price/service level bid.

Service Futures Market—The technical module required to allow a consumer/provider to claim the rights to purchase/sell a specific service at a later date for a specific price.

Service Request—The technical module required to allow a consumer to subscribe and/or order service from a provider.

Automated Service Workflows—The technical module required to allow a provider to coordinate the work steams, including approvals, needed to fulfill the service through automation.

Service Workflow Templates—Pre-defined used to populate automated service workflow technology, creating the capability quickly define and execute out of the box service fulfillment.

Task Automation (e.g. TPM)—The technical module required to execute specific tasks (e.g., server image) within a broader service workflow.

3rd Party Integration—The technical module required to connect service technical enablers to 3rd party products.

Asset Repository—The technical modules required to track and manage assets as they relate to the services they support.

Change Automation—The technical module required to automate the change management process and associated workflow.

Release Automation—The technical module required to automate the release management process and associated workflow.

Configuration Automation—The technical module required to automate the configuration management process and associated workflow.

Service Dashboard—The technical module required to monitor in real time the consumption of subscription and single request services, and the current service level attainment of the service provider to a specific consumer.

Problem/Incident—The technical module required to automate the problem/incident management process and associated workflow.

Performance Management—The technical module required to automate the performance management process and associated workflow.

Service Notification—The technical module required to provide real time notification to interested parties in the case of service level quality deterioration or a breach of consumption thresholds.

Metering—The technical module required to measure consumption of specific IT resources as they relate to services.

Auditing—The technical module required to audit and report on service quality.

Autonomic Service Level Management—The technical module required to proactively sense and recognize service level quality deterioration and provide an automated response to fix the issue prior to service failure.

Service Level Analytics—The technical module required to report on the quality of service level attainment (subscription and single request) for each of the available services.

Demand Planning—The technical module required to manage the cycle of capturing upcoming service demand from various consumers, modifying price based on aggregated demand and service cost characteristics and revisiting the demand projections until pricing and consumption projections are finalized.

Subscription Management—The technical module required to capture and report on all services that are currently and historically subscribed to by consumers.

Capacity Planning—The technical module required to automate the capacity planning process and associated workflow.

Service Consumption—The technical module required to capture and report on current and historical consumption of service by consumers.

Service Costing—The technical module required to allocate direct and indirect cost as they relate to services.

Time Tracking—The technical module required to allow providers to track their time against the services.

Budgeting—The technical module required to allow a service consuming organization and service provider to communicate and manage their budgets as they relate to current services—potential service upgrade/decommission or new service investment.

Service Pricing—The technical module required to allow a provider to price the upcoming service execution cycle, based on service cost allocations and upcoming projected demand.

Service Billing Allocations—The technical module required to allow a provider to charge the consumers for the services they consumed in a given period.

Service Oriented Financial Analytics—The technical module required to allow a consumer to pull reports on chargeback's they have incurred and the underlying detail (subscriptions, assets, one time request etc.) underneath the charge.

Billing Feedback—The technical module required to allow a consumer to dispute a particular charge, typically as a result of the underlying service consumption detail being incorrect.

Benchmarking—The technical module required to allow a provider to compare its service delivery quality/cost to external service providers and research entities best practice service quality/cost through a comprehensive data store.

Service Oriented Project Management—The technical module required to manage investments and the underlying projects within a services construct.

What is claimed is:

1. A method for a supply oriented Information Technology (IT) organization within a given business to move from a supply driven to a demand driven service utility for said given business, the method comprising the step of:

defining IT services provided by said organization to the business to form a cohesive communication framework with the business, including the step of identifying IT needs and requirements of IT end users in said business, and aligning said needs and requirements back to a strategy and vision of the IT organization, including developing a service catalog to define and to communicate the product and services the IT organization offers to its customers, including using templates provided by consulting groups, software vendors and best practice repositories to help build the service catalog, wherein each user is only entitled to see selected ones of the service in the service catalog;

converting the IT to a product by structuring the IT, including organization, technology, process, and financial, around the services and products the IT organization communicates and delivers to its customers, including the step of putting key technologies in place to support a process to productize the IT while maintaining effective customer service and overall decision making, including the step of:

i) establishing a front end portal for the service catalog to provided a real time self-service mechanism for customers to request services they are permitted to access; and once an order is requested by a requestor, the requestor tracks a status of the order through the portal, ii) designing and automating back end workflows of each service, iii) identifying how IT costs relate to ongoing services, including articulating upcoming demand for services to draft first estimated prices for the services, the given business providing new input into project demand based on said estimated prices, revising pricing for changing projected demand, and the IT organization aggregating all demand and updating a service oriented budget to support the demand projections, and iv) allocating said costs to consumers who receive value from said ongoing services;

transforming the IT into a factory by consolidating and standardizing key process while putting in service oriented measurement and feedback mechanisms, including the step of, after service workflow are automated, documenting, formalizing and standardizing key processes across the IT organization, said key processes including configuration, change, release, problem or incident, capacity, and service oriented project management, including establishing a real time service dashboard to allow the IT organization and consumers of the services to understand a current consumption of the services and service level attainment at any given period of time;

running the IT as a utility transform effectively targeted services and their underlying infrastructures into a commodity, including the step of, once a service has been standardized and structured into a variable cost structure, employing real time market forces to the pricing and execution of the service; and using a computer system, executing an IT service management technology enablement model, to perform the steps of converting the IT into a product and transforming the IT into a factory; and wherein:

the step of employing real time market forces to the pricing and execution of the service includes the steps of:

providing a real time quotes for service requests based on just in time costs parameters;

employing multiple type of auctions to allow service providers to the IT organization to bid on new service contracts, and multiple type of auctions including highest bid auctions and reverse auctions;

establishing a service futures market to create contracts for service delivery in the future; and using autonomic service level management technologies to proactively detect upcoming service level threshold breaches by calculating task completion and then comparing the calculated task completion to task time remaining and resource availability.

2. A method according to claim 1, wherein the step of allocation said costs includes the step of mapping each IT cost, including all labor and assets, to one of the services provided by the IT organization.

3. A method according to claim 1, wherein step of transforming the IT into a factory includes the further steps of:

establishing performance monitoring to measure compliance with current service oriented service level objectives; and continually auditing historical records to ensure service compliance with industry and organization regulations and polices.

* * * * *